(12) United States Patent
Kantola et al.

(10) Patent No.: US 10,842,094 B2
(45) Date of Patent: Nov. 24, 2020

(54) HYDROPONIC GROWING SYSTEM

(71) Applicant: GREEN AUTOMATION EXPORT OY, Helsinki (FI)

(72) Inventors: Juhana Kantola, Espoo (FI); Tero Rapila, Otalampi (FI)

(73) Assignee: GREEN AUTOMATION EXPORT OY, Helsinki (FI)

( * ) Notice: Subject to any disclaimer, the term of this patent is extended or adjusted under 35 U.S.C. 154(b) by 340 days.

(21) Appl. No.: 15/560,003

(22) PCT Filed: Mar. 9, 2016

(86) PCT No.: PCT/FI2016/050140
§ 371 (c)(1),
(2) Date: Sep. 20, 2017

(87) PCT Pub. No.: WO2016/151186
PCT Pub. Date: Sep. 29, 2016

(65) Prior Publication Data
US 2018/0064046 A1    Mar. 8, 2018

(30) Foreign Application Priority Data
Mar. 25, 2015   (FI) ..................................... 20155214

(51) Int. Cl.
*A01G 31/02* (2006.01)
*A01G 9/04* (2006.01)

(52) U.S. Cl.
CPC ............. *A01G 31/02* (2013.01); *A01G 9/047* (2013.01); *Y02P 60/21* (2015.11)

(58) Field of Classification Search
CPC .......... A01G 31/00; A01G 31/02; A01G 9/04; A01G 9/047
See application file for complete search history.

(56) References Cited

U.S. PATENT DOCUMENTS

| 4,833,825 A | 5/1989 | Sprung |
| 10,051,799 B1 * | 8/2018 | Van Wingerden ..... A01G 31/02 |

(Continued)

FOREIGN PATENT DOCUMENTS

| CA | 2839505 A1 * | 12/2012 | ............. A01G 31/00 |
| DE | 202011004908 U1 * | 7/2012 | ............. A01G 31/02 |

(Continued)

OTHER PUBLICATIONS

Translation of DE-202011004908, Jul. 2012.*

(Continued)

*Primary Examiner* — Monica L Barlow
*Assistant Examiner* — Aaron M Rodziwicz
(74) *Attorney, Agent, or Firm* — Oliff PLC

(57) ABSTRACT

A hydroponic growing system including an elongated trough. The trough includes at least a first side wall, an opposite second side wall, and a bottom wall, which all extend in the longitudinal direction of the trough and delimit a space in the centre of the trough, open at the top. The trough also includes a partition wall structure extending in the longitudinal direction of the trough and dividing said central space into two adjacent elongated grooves which are open at the top and into which one or more substrates can be placed for the cultivation of plants. In an example, the partition wall structure includes an elongated overflow channel extending in the longitudinal direction of the groove and guides the irrigation water past the grooves. The overflow channel may be arranged in an elevated position with respect to the bottom wall.

12 Claims, 4 Drawing Sheets

(56) References Cited

U.S. PATENT DOCUMENTS

| | | | |
|---|---|---|---|
| D839,783 S * | 2/2019 | Van Wingerden | A01G 9/047 D11/156 |
| 2008/0302010 A1 * | 12/2008 | Cordon | A01G 9/047 47/59 R |
| 2013/0202358 A1 * | 8/2013 | Archipley | A01G 9/047 405/126 |
| 2015/0082696 A1 * | 3/2015 | Barendregt | A01G 9/047 47/66.7 |

FOREIGN PATENT DOCUMENTS

| | | | | |
|---|---|---|---|---|
| EP | 0 038 709 A1 | 10/1981 | | |
| FR | 1384933 A * | 1/1965 | | A01G 31/02 |
| FR | 2341263 A1 * | 9/1977 | | A01G 31/02 |
| FR | 2659192 A1 * | 9/1991 | | A01G 31/02 |
| FR | 2791865 A1 * | 10/2000 | | A01G 9/047 |
| FR | 2893820 A1 * | 6/2007 | | A01G 9/047 |
| GB | 668757 A * | 3/1952 | | A01G 9/047 |
| GB | 2074001 A * | 10/1981 | | A01G 31/02 |
| GB | 2 074 834 A | 11/1981 | | |
| GB | 2 113 518 A | 8/1983 | | |
| JP | S60-091926 A | 5/1985 | | |
| JP | H02-222625 A | 9/1990 | | |
| NL | 1 013 090 C2 | 3/2000 | | |
| RU | 2 048 070 C1 | 11/1995 | | |
| WO | WO-2007099186 A1 * | 9/2007 | | A01G 9/047 |
| WO | 2012/172187 A1 | 12/2012 | | |

OTHER PUBLICATIONS

Jul. 1, 2019 Office Action and Search Report issued in Russian Patent Application No. 2017134786.

Jul. 4, 2016 Search Report issued in International Patent Application No. PCT/FI2016/050140.

Jul. 4, 2017 Written Opinion issued in International Patent Application No. PCT/FI2016/050140.

Jan. 7, 2020 Office Action issued in Japanese Patent Application No. 2017-548096.

* cited by examiner

HYDROPONIC GROWING SYSTEM

FIELD OF THE INVENTION

The invention relates to a hydroponic growing system.

BACKGROUND OF THE INVENTION

The growing of green vegetables in greenhouses is based on hydroponic cultivation systems and the use of e.g. elongated troughs. The troughs are open at the top, or the top surface of the troughs is provided with openings in which the seedlings are placed. The trough is filled with a substrate for the plants, or the seedlings with root balls acting as the substrate are placed in the openings. The material of the substrate is, for example, peat or mineral wool, such as glass wool. The root ball may also be surrounded by a supporting structure which is, for example, a mesh-like pot made of, for example, plastic or compressed peat. The seed of the plant can be sown in the substrate, which may be an elongated or ribbon-like element placed in the trough.

Publication WO 2012/172187 A1 discloses a hydroponic growing system and an elongated trough for the cultivation of plants, in which trough a growing substrate can be placed. Said trough can be utilized in greenhouses.

The trough is placed on a cultivation table in a greenhouse, where the seedling of the plant is allowed to grow as long as the plant is ready to be harvested. In some examples, the germination of the sown seeds is also performed in troughs on a cultivation table. Normally, automated cultivation tables are used, which automatically irrigate the plants and move the trough forward, wherein the direction of movement is transverse to the longitudinal direction of the trough. The cultivation tables also change the spacing of the troughs so that the spacing of the troughs is automatically increased as the plant grows in size.

The roots of the seedlings are placed in the trough, into which irrigation water with nutrients is supplied as well. The roots of the seedlings take in the irrigation water needed, some of the irrigation water is absorbed in the substrate, and the unused portion of the irrigation water can be drained off along the trough. In an example, the irrigation water is introduced in the trough via one end of the trough, and surplus irrigation water is discharged from the trough via the opposite other end of the trough. The trough is made of e.g. plastic, by applying e.g. extrusion as the manufacturing method.

The suitability of the troughs for several plants of different sizes is inadequate. Moreover, the troughs have drawbacks in the way of conveying irrigation water along the trough, and controlling its amount.

BRIEF SUMMARY OF THE INVENTION

A hydroponic growing system according to the invention is presented in claim 1.

A solution is now presented for intensifying the cultivation of plants, particularly green vegetables, in greenhouses, and for improving the operation of the troughs.

According to an embodiment, the solution is a hydroponic growing system comprising an elongated trough. Said trough comprises at least a first side wall, an opposite second side wall, and a bottom wall, which all extend in the longitudinal direction of the trough and delimit a space in the centre of the trough, open at the top.

Further, the trough comprises a partition wall structure placed between the first side wall and the second side wall, extending in the longitudinal direction of the trough, and dividing the space in the centre of the trough into two adjacent elongated grooves. Said grooves are open at the top, and one or more substrates can be placed in each, for the cultivation of plants. Thus, several plants can be placed one after another in the longitudinal direction of the trough.

By means of the solution, two adjacent rows of plants can be cultivated in the same trough. Advantages are obtained particularly in the case that the plants are smaller in size than plants which fit in only one row in each trough. In this way, better space utilization and a higher plant density is achieved on the cultivation table utilized in the hydroponic growing system, several troughs being placed on top of it, adjacent to each other. The cultivation table is preferably automated, as presented above.

By means of the presented solution, it is now possible to use a trough with two rows of plants and having a width corresponding to the width of conventional troughs for one row of plants. The advantage is that no or only slight modifications need to be made in the operation of e.g. conventional cultivation tables, for applying a trough according to the presented solution.

According to an example of the solution, the partition wall comprises an elongated overflow channel extending in the longitudinal direction of the trough. The overflow channel is configured to receive irrigation water supplied to the trough, and to guide the irrigation water along the trough and forward, past the above mentioned grooves next to each other.

The advantage in this example is the improved control of the quantity and flow of irrigation water in the trough. By means of the separate overflow channel, surplus irrigation water can be efficiently discharged from the trough. By the placement of the overflow channel, for example by the choice of its height position, it is possible to control how high the irrigation water level is allowed to rise. With the improved control of the quantity and flow of irrigation water, it is also easier to avoid that e.g. material used in the growing substrate is entrained in the irrigation water or washed away from the trough.

By means of the overflow channel, irrigation water can be discharged from the trough even if the above mentioned groove or other channel intended for irrigation water has been silted up A blockage may also be caused by plant roots that have grown to fill up said groove or irrigation channel. By means of the overflow channel, it is possible to lead irrigation water away from the blocked groove or irrigation channel past the blockage and back to said groove or irrigation channel.

According to an example of the solution, said groove may comprise an upper space placed at the top of the groove and intended for the substrate, and a lower space placed at the bottom of the groove and intended for irrigation water. The lower space is connected to the upper space via one or more holes or slits. In the lower space, irrigation water can flow forward along the opening of the trough.

The advantage is the separate upper space for holding the growing substrate, for example by means of a funnel shape. The roots of the plant can even grow through said hole or slit to the separate lower space in which the irrigation water flows. Via said hole or slit, the irrigation water can be absorbed into the substrate. Irrigation water will flow more easily along the trough via the separate lower space than in the case of having to pass through the growing substrate only.

The trough according to the presented solution can be applied, for example, in the hydroponic cultivation system of WO 2012/172187 A1. The hydroponic growing system may also comprise a cultivation table which is automated and functions as presented in this description, comprising means for distributing irrigation water to troughs according to the presented solution.

DESCRIPTION OF THE DRAWINGS

In the following, the presented solution will be described with reference to the appended drawings, in which.

DETAILED DESCRIPTION OF THE INVENTION

Figure 1:
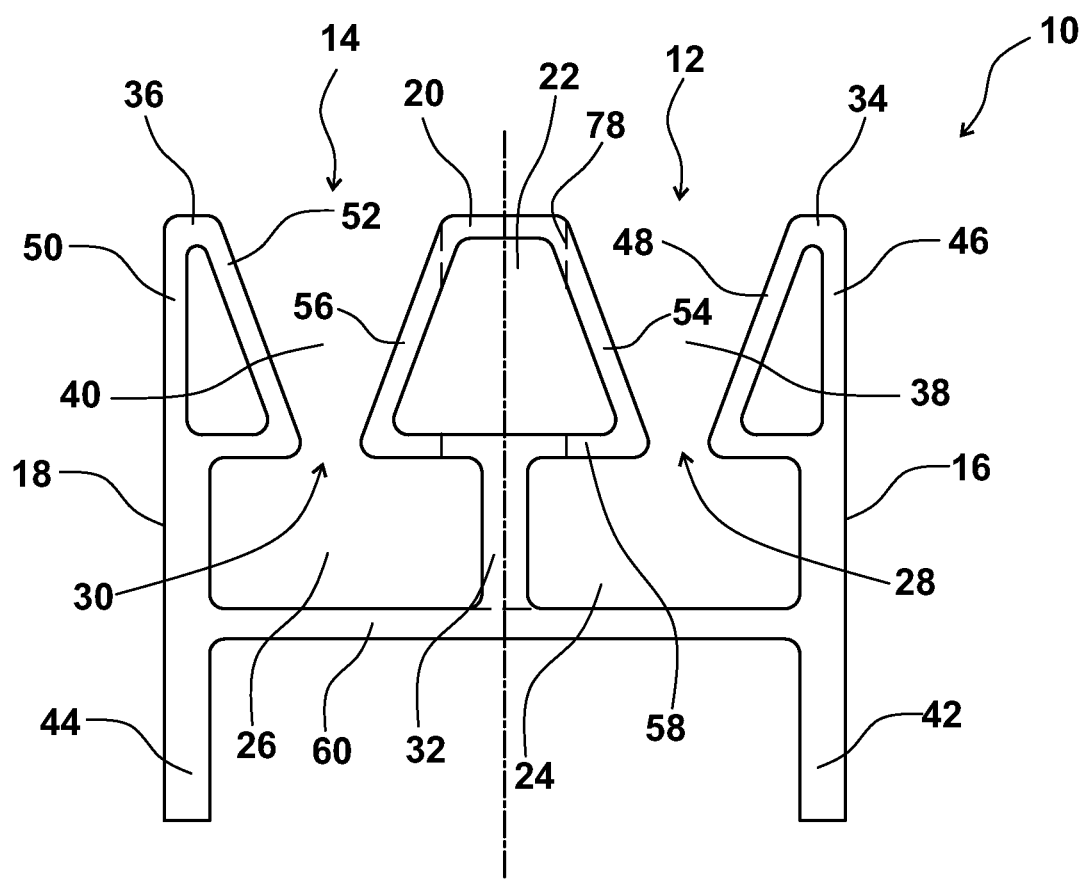
FIG. 1 shows a trough according to an example of the solution in a cross-sectional view from the end of the trough.

In the following, the presented solution will be described with reference to the appended drawings 1 to 6. In the drawings, the same reference numbers are used to refer to the same or corresponding parts.

Figure 2:
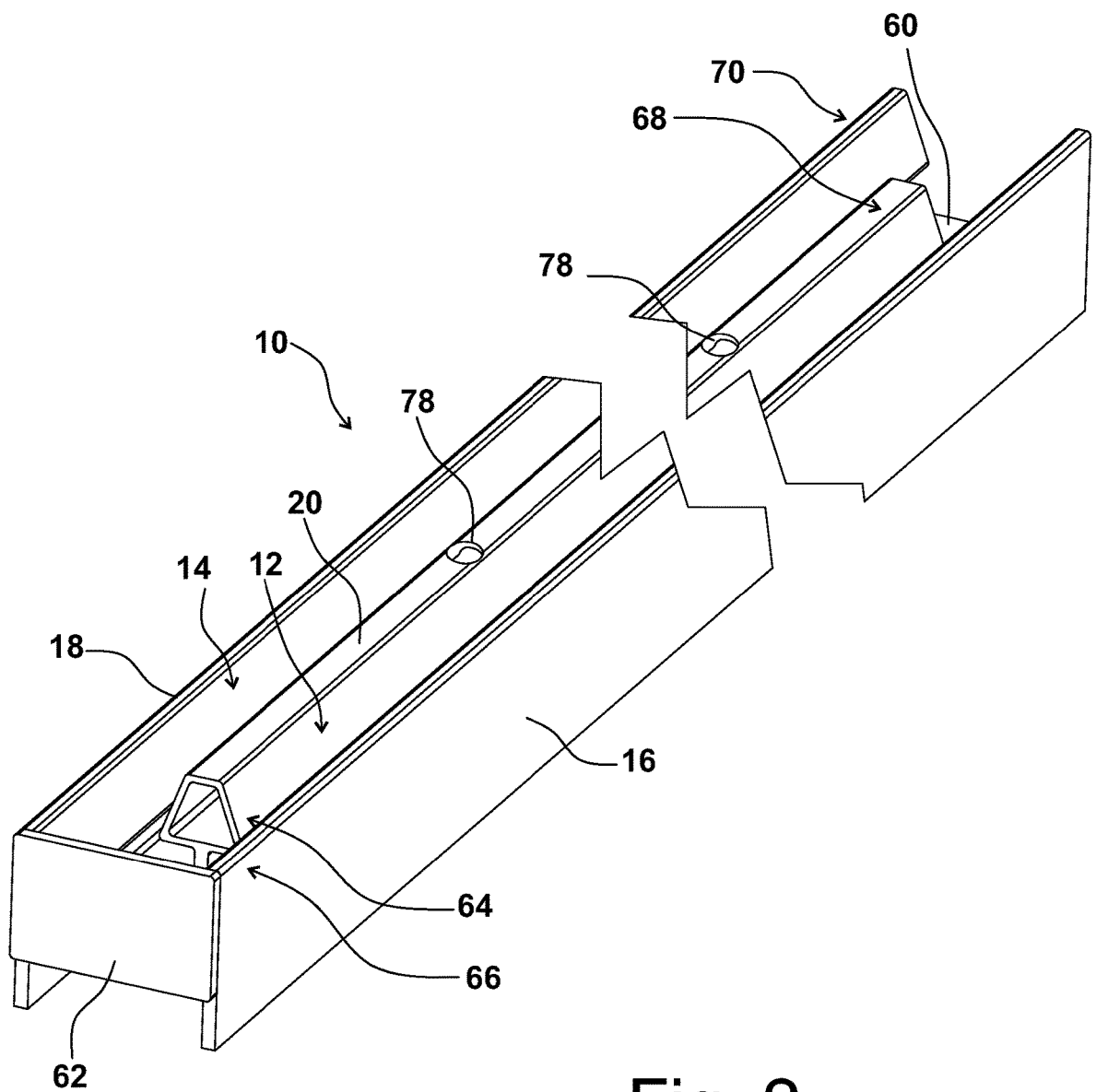
FIG. 2 shows the structure of the elongated trough according to FIG. 1.

FIGS. 1 and 2 show a hydroponic growing system according to an example of the present solution, comprising an elongated trough 10. FIG. 1 shows a longitudinal cross-section of the trough 10, and the trough 10 is shown in the position of use, being substantially horizontal.

The trough may comprise at least a first side wall 34, an opposite second side wall 36, and a bottom wall 60, which all extend in the longitudinal direction of the trough 10 and delimit a space in the centre of the trough 10, open at the top.

Several troughs 10 may be placed on cultivation tables which preferably take care of the irrigation of the plants in the adjacent troughs in an automated way and move the troughs forward, and also change the spacing of the troughs automatically so that the spacing is increased as the plants grow in size. Now referring to FIG. 2, irrigation water is supplied to one end 66 of the trough 10 on the cultivation table, and irrigation water is discharged from the trough via the opposite second end 70 of the trough 10.

In an example of the solution and according to FIG. 1, the trough 10 comprises a partition wall structure 20 placed between the first side wall 34 and the second side wall 36, inside the trough 10 and spaced from the side walls 34, 36, and extending in the longitudinal direction of the trough 10. The partition wall structure 20 divides the central space of the trough 10 into two adjacent elongated grooves 12, 14 which are open at the top.

For the cultivation of plants, separate growing substrates 74, 76 can be inserted in the grooves 12, 14 of the trough 10, in which the plants 72 are placed. The function of the grooves 12, 14 is to convey irrigation water along the trough 10 and to distribute it to the substrates 74, 76.

The growing substrate 74, 76 may consist of an elongate or ribbon-like material. The substrates 74, 76 may also consist of single or separate pieces or elements, or the substrate 74, 76 can be formed of loose material that is placed in the trough 10 and is suitable for cultivation. The substrate used may be, for example, peat or mineral wool, such as glass wool, even expanded clay. A seedling of the plant may be placed in the substrate 74, 76, or seeds may be sown in it, which are germinated in the trough e.g. on the cultivation table or in a separate place.

The trough 10 is made of e.g. plastic by extrusion, wherein the cross-sectional shape of the trough 10 shown in FIG. 1 extends continuously in the longitudinal direction of the elongated trough 10 as shown in FIG. 2. The trough 10 is preferably uniform, and its different parts are seamlessly joined to each other.

According to an example and FIG. 1, the side walls 34, 36 may be vertical in their use position, and the bottom wall 60 may be horizontal. By means of the side walls 34, 36 and the bottom wall 60, the trough 10 is formed to correspond to e.g. a U-shape or an H-shape. The side walls 34, 36 may have side surfaces 16, 18 which are preferably vertical.

The side wall 34 may comprise walls 42, 46, 48 of variable thickness which may also encompass open or closed chambers or channels which may extend in the longitudinal direction of the trough 10. The side wall 36 may comprise walls 50, 52, 44 of variable thickness which may also encompass open or closed chambers of channels which may extend in the longitudinal direction of the trough 10.

According to an example and FIG. 1, the side walls 34, 36 may extend below the bottom wall 60 in the vertical direction, and their lower parts together with the walls 42, 44 form a leg structure on which the trough 10 rests and which holds the bottom wall 60 on a desired height level.

According to an example and FIG. 1, the top part of at least one side wall 34, 36 together with the walls 46, 48, 50, 52 forms a structure inside the trough 10 that becomes broader downwards in the transverse direction of the trough 10. The cross-section of said structure may have the shape of e.g. a triangle or a right-angled triangle. Said broadening structure extends down to the bottom wall 60 or close to it, or ends in the middle part of the trough 10.

The partition wall structure 20 may comprise walls 32, 54, 56, 58 of variable thickness which may also encompass open or closed chambers of channels which may extend in the longitudinal direction of the trough 10.

According to an example and FIG. 1, the lower part of the partition wall structure 20 together with the wall 32 forms a leg structure, via which the partition wall structure 20 is connected to the bottom wall 60. Preferably, the partition wall structure 20 extends upwards to the same height with at least one of the side walls 34, 36. The side walls 34, 36 preferably have the same height. Also preferably, the partition wall structure 20 is centrally placed in the trough 10, substantially at equal distances from both of the side walls 34, 36.

In an example and FIG. 1, the top part of the partition wall structure 20 together with the walls 54, 56, 58 forms a structure inside the trough 10 that becomes broader downwards in the transverse direction of the trough 10. Said structure follows the cross-sectional shape of e.g. a truncated pyramid or cone. In another example, said structure is provided on only one side of the partition wall structure 20, whereby said structure follows the cross-sectional shape of e.g. a triangle or a right-angled triangle. Said broadening structure extends down to the bottom wall 60 or close to it, or ends in the middle part of the trough 10, being fastened to the wall 32 acting as a leg structure.

When both the partition wall structure 20 and the side walls 34, 36 have a downwards broadening shape, the tops of the grooves 12, 14 become narrower downwards in the transverse direction of the trough 10. Each tapering groove 12, 14, or one of them, extends down to the bottom wall 60 or close to it, or ends in the middle part of the trough 10.

In an example and FIG. 1, the partition wall structure 20 may comprise an elongated overflow channel 22 extending in the longitudinal direction of the trough 10.

The function of the overflow channel 22 is to receive irrigation water supplied into the trough 10 and to convey it forward along the trough 10 so that at least part of the irrigation water can bypass the grooves 12, 14 and the substrates 74, 76 placed therein, if necessary.

The overflow channel 22 may be the above presented open or closed chamber or channel formed in the partition wall structure 20. In an example and FIG. 1, the walls 54, 56, 58 delimit the overflow channel 22 which may be at least partly open at the top or from below. Preferably, the overflow channel 22 is closed at the top and enclosed by the walls 54, 56, 58.

In an example and FIG. 1, the overflow channel 22 is arranged in an elevated position with respect to the bottom wall 60. In other words, the overflow channel 22 is placed higher in the vertical direction of the trough 10 than the lower part of the groove 12, 14, along which the irrigation water is allowed to flow.

In an example and FIG. 1, the irrigation water flows along the bottom wall 60 in the groove 12, 14, so that the bottom wall 60 is placed lower than the level of the overflow channel 22, along which the the irrigation water can flow in the overflow channel 22. The height level of the overflow channel 22 is determined by e.g. the wall 32 used as the leg structure. In the overflow channel 22, the wall 58 may constitute the bottom surface, on which the irrigation water flows. Thus, the wall 58 is placed higher than the bottom wall 60.

Figure 3:
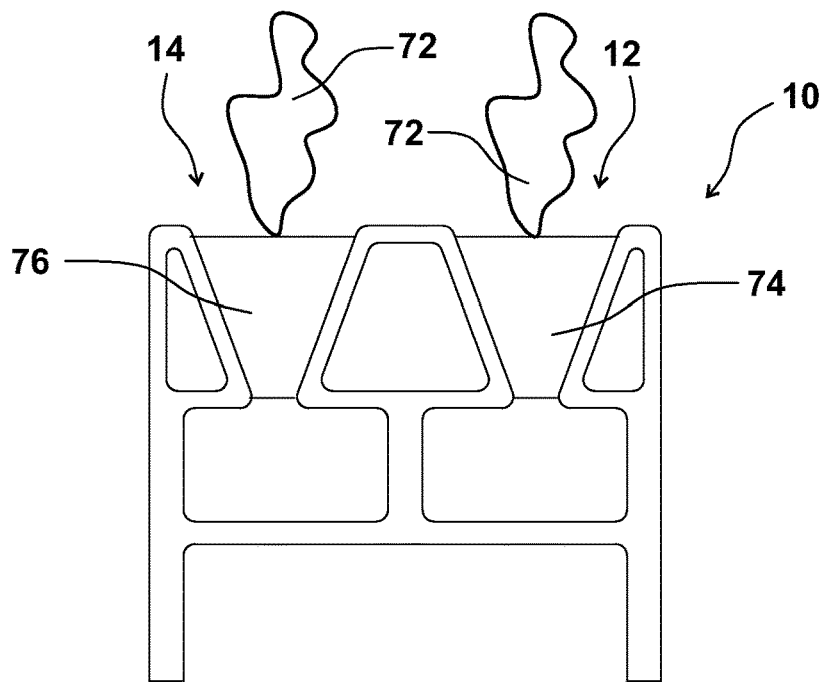
FIG. 3 shows a cross-section of the trough of FIG. 1, seen from the end of the trough and with a substrate placed in the trough.

In an example and FIG. 1, at least one of the grooves 12, 14 comprises an upper space 38, 40 placed in the upper part of said groove 12, 14. The upper space 38, 40 is intended for the growing substrate 74, 76, as shown in FIG. 3.

Preferably, said upper space 38, 40 has such a structure that it holds the substrate 74, 76 at a desired height, separate from the lower space 24, 26 of the groove 12, 14. The upper space 38, 40 may have a downwards tapering shape, as presented above. The upper space 38, 40 is open at the top and at least partly open from below. The shape of the upper space 38, 40 is defined by the partition wall structure 20 and the side walls 34, 36.

A narrowing, a collar or a wall may be provided between the upper space 38, 40 and the lower space 24, 26, for supporting the growing substrate. Said narrowing, collar or wall is formed in the partition wall structure 20 or the side wall 34, 38, or both.

The lower space 24, 26 can have a e.g. polygonal or rectangular shape, or it can be at least partly open at the top. Irrigation water flows in the lower space 24, 26 along the groove 12, 14 of the trough 10.

The upper space 38, 40 is connected to the lower space 24, 26 via one or more holes or slits 28, 30. The above mentioned narrowing, collar or wall may constitute said hole or slit 28, 30. Alternatively, for example, said slit 28, 30 is formed between the partition wall 20 or the side wall 34, 38, or both, by their shape, as also in the example of FIG. 1. The roots of the plant have access via the hole or slit 28, 30 to the lower part of the groove 12, 14, and irrigation water has access through the hole or slit 28, 30 to the upper part of the slit 12, 14 and to the growing substrate 74, 76.

In an example and FIG. 1, the hole or slit 28, 30 is elongated and extends in the longitudinal direction of the trough 10. The length of said hole or slit 28, 30 corresponds to the length of the partition wall structure 20.

In an example and FIG. 1, the lower space 24, 26 constitutes an irrigation channel extending in the longitudinal direction of the trough 10. Said irrigation channel is configured to convey irrigation water forward along the trough 10.

Said irrigation channel may also have the shape of a rectangle whose width in the transverse direction of the trough 10 is greater than the width of said hole or slit 28, 30.

Figure 4:
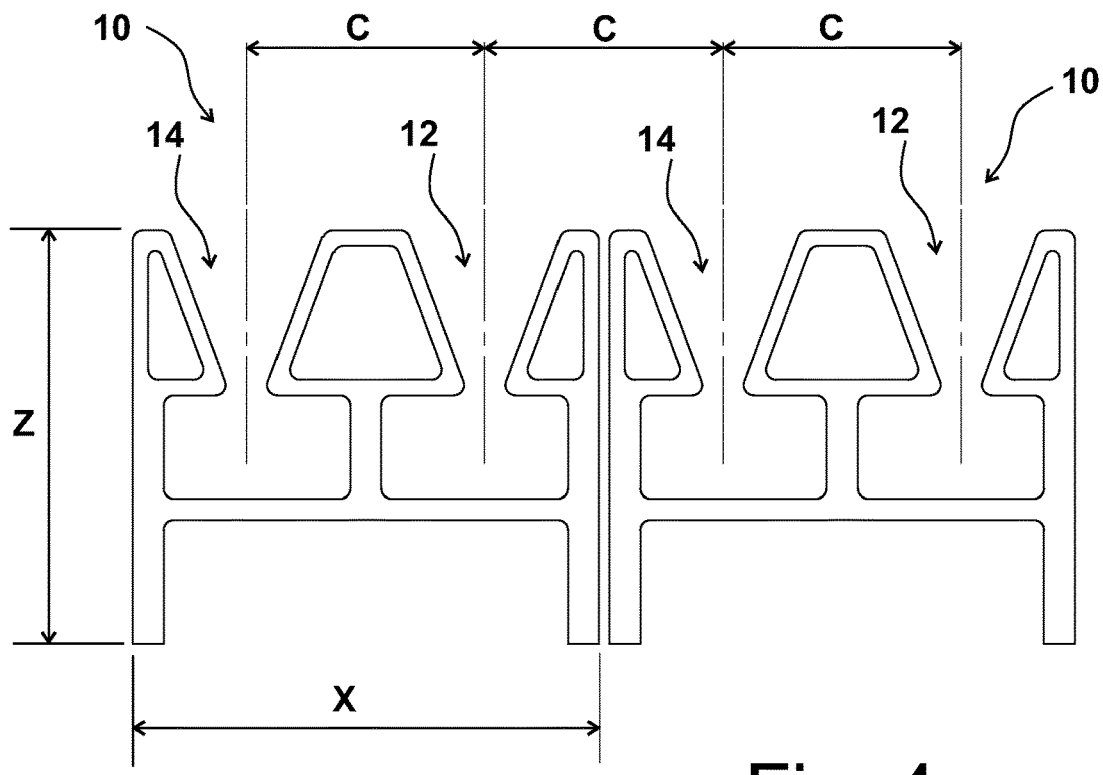
FIG. 4 shows adjacent troughs according to FIG. 1, in a cross-sectional view from the end of the troughs.

In the example of FIGS. 2 and 4, in at least one end 66, 70 of the trough 10, the side walls 34, 36 and the bottom wall 60 extend farther than the partition wall structure 20 in the longitudinal direction of the trough 10. This is preferably at least at the first end 66 of the trough 10 into which the irrigation water is intended to be supplied. As a result, a space is formed at the first end 66, limited by the side walls 34, 36 and the bottom wall 60, into which space the irrigation water can be supplied.

A corresponding space can be formed at the second end 70 of the trough 10, via which the irrigation water can be led out of the trough 10. The second end 70 may be open, without an end wall, whereby the irrigation water will be drained from the trough over the end edge of the bottom wall 60. In an example, in at least one end 66, 70 of the trough 10, the side walls 34, 36 extend farther than the bottom wall 60 in the longitudinal direction of the trough 10. This is preferably the case at the second end 70 of the trough 10, so that the irrigation water can be discharged form the trough 10 across the end edge of the bottom wall 60 even before the terminal point of the side walls 34, 36. Thus, the second end 70 can be closed by an end wall, in the same way as in an example embodiment, in which the bottom wall 60 of the trough is provided with one or more openings, through which the irrigation water can exit the trough and the groove 12, 14.

Figure 5:
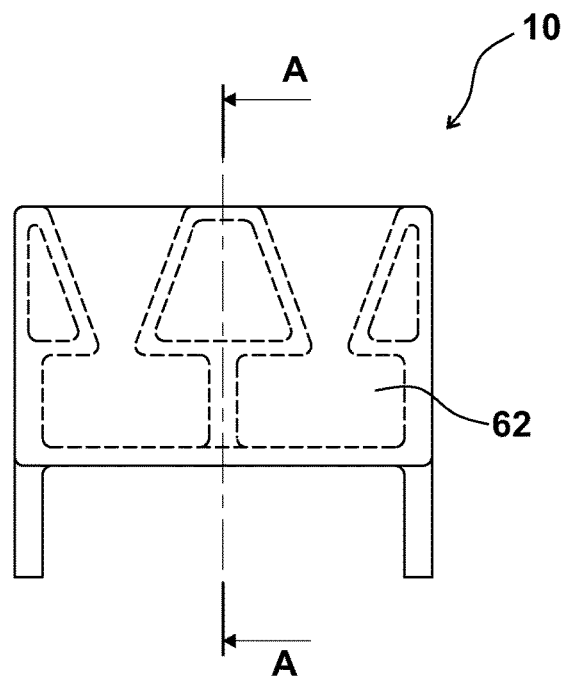
FIG. 5 shows the trough according to FIG. 2, seen from one end of the trough.
Figure 6:
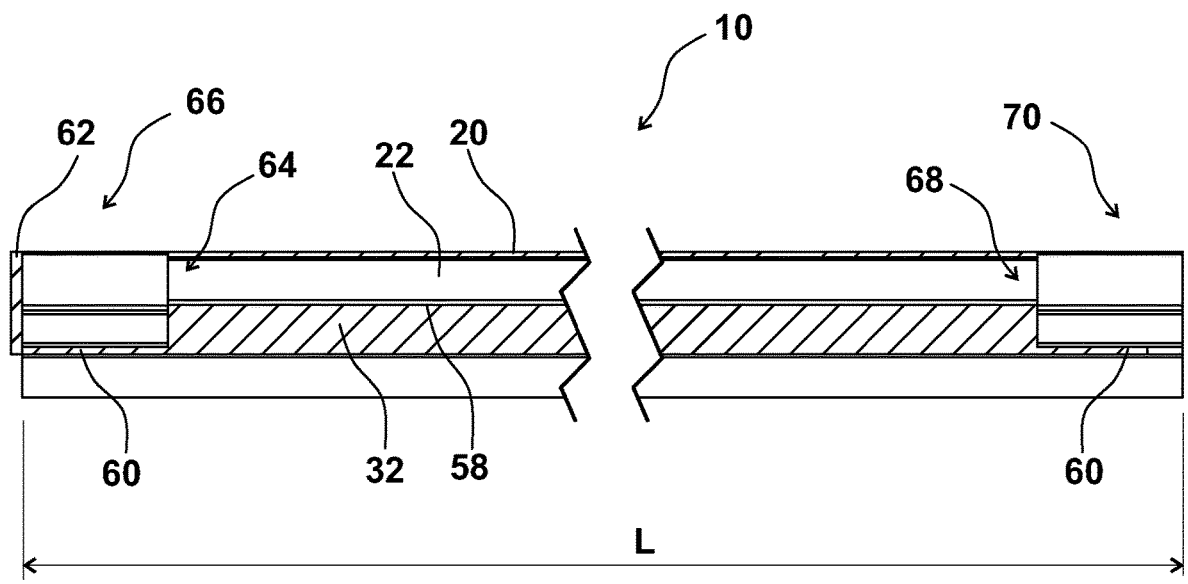
FIG. 6 shows a cross-section of the trough of FIG. 2, seen from the side of the trough and as a section at the point A-A of FIG. 5.

Also preferably, at least one end 66, 70 of the trough 10, particularly the first end 66, is closed by an end wall 62, as shown in FIGS. 5 and 6.

In an example and FIG. 2, the end wall 62 is fastened to at least the first and the second side walls 34, 36 as well as the bottom wall 60, and seals off the first end 66. The irrigation water is thus guided along the trough 10 towards the opposite second end 70 of the trough 10. In an example and FIGS. 2 and 6, the first end 66 is provided with an open space connected to both of the grooves 12, 14 and the overflow channel 22, to which the irrigation water has access via e.g. the first end 64 of the partition wall structure 20. In an example and FIGS. 2 and 6, the second end 70 is also provided with an open space connected to both of the grooves 12, 14 and the overflow channel 22, from which the irrigation water is discharged via e.g. the second end 68 of the partition wall structure 20.

In an example and FIGS. 1 and 2, the partition wall structure 20 is provided with one or more holes 78, via which the irrigation water can pass from either one or both of the grooves 12, 14 into the overflow channel 22 and vice versa. In an example and FIGS. 1 and 2, the hole 78 enables the flow of irrigation water from the groove 12 to the groove 14, and vice versa. Preferably, several holes 78 are provided and placed at a distance from each other in the longitudinal direction of the trough 10. In an example, the hole 78 is formed by drilling a vertical hole in the partition wall structure 20, extending to the level of the bottom wall 60 or close to it, or at least providing a connection from the overflow channel 22 to at least one groove 12, 14 and possibly also between the grooves 12, 14.

In FIG. 4 and an example, the trough 10 is dimensioned so that the distance C between the centres of the grooves 12, 14 of the trough 10 in the transverse direction of the trough 10 is substantially equal to the distance C of the centre of the outermost groove 12, 14 of said trough 10 to the centre of the closest groove 12, 14 of the adjacent trough 10, when the troughs 10 are placed next to each other, for example so that the side surfaces 16, 18 of the troughs 10 are abutting or close to each other. In this way, the plants can be placed at regular intervals on the cultivation table.

In an example, the height Z of the trough 10 is between 30 and 50 mm, preferably about 40 mm. In an example, the width X of the trough 10 in the transverse direction is between 35 and 55 mm, preferably about 45 mm. In an example, the distance C is between 18 and 28 mm, preferably about 23 mm. In an example, the length L of the trough 10 is between 5000 and 6000 mm.

In an example, the width of the slit 28, 30 in the transverse direction of the trough 10 is about 4 mm, the height of the upper space 38, 40 is about 16 mm, and the height of the lower space 24, 26 is about 10 mm. In an example, the thickness of the wall or walls of the trough is about 1.5 mm or 3 mm. In an example, seeds are placed at regular intervals of e.g. 50 mm in each growing substrate 74, 76. The seeds of adjacent growing substrates 74, 76 are placed in an interlocked manner with respect to each other in the longitudinal direction of the trough 10, at intervals of e.g. 25 mm.

The presented solution is not limited solely to the above presented examples, alternatives or embodiments. In the presented solution, it is possible to combine the above presented examples to form a hydroponic irrigation system of a desired type. The presented solution can be applied within the scope of the technical characteristics of the claims to be presented hereinbelow.

The invention claimed is:

1. A hydroponic growing system, comprising an elongated trough comprising at least:
   a first side wall, an opposite second side wall, and a bottom wall, which all extend in a longitudinal direction of the trough and delimit a central space in the center of the trough, the central space being open at the top, and an end wall being fastened to the first side wall, the second side wall, and the bottom wall; and
   a partition wall structure connected to the bottom wall and located between the first side wall and the second side wall, the partition wall structure extending in the longitudinal direction of the trough and dividing the central space into two adjacent elongated grooves which are open at the top, wherein each groove is adapted to receive one or more substrates in which plants are placed for the cultivation of plants;
   wherein each groove is adapted to convey irrigation water supplied to a first end of the trough along the trough and to distribute the irrigation water to the one or more substrates, the first end of the trough being closed by the end wall, and the bottom wall of the trough being adapted to guide the irrigation water to flow forward on the bottom wall of the trough along the adjacent grooves that are adapted to discharge the irrigation water from an opposite, second end of the trough;
   wherein the partition wall structure comprises an elongated overflow channel extending in the longitudinal direction of the trough, the overflow channel being in an elevated position with respect to the bottom wall of the trough and adapted (i) to receive a surplus of the irrigation water supplied into the first end of the trough and (ii) to guide the surplus irrigation water forward along the trough past the adjacent grooves to be discharged from the second end of the trough; and
   wherein the overflow channel comprises an overflow bottom wall that (i) is located higher than the bottom wall of the trough and (ii) is adapted to guide the surplus irrigation water to flow on the overflow bottom wall along the overflow channel.

2. The growing system according to claim 1, wherein the overflow channel is closed at the top over a whole length of the overflow channel or almost the whole length of the overflow channel.

3. The growing system according to claim 1, wherein the partition wall structure comprises one or more openings, gaps, or holes which are adapted to convey irrigation water from the overflow channel to one or both of the adjacent grooves and from one or both of the adjacent grooves to the overflow channel.

4. The growing system according to claim 1, wherein at the first end of the trough, the first side wall, the second side wall, and the bottom wall extend in the longitudinal direction of the trough farther than the partition wall structure.

5. The growing system according to claim 1, wherein each of the adjacent grooves comprises:
   an upper space located in an upper part of the groove and adapted to receive the one or more substrates, and
   a lower space located in a lower part of the groove and connected to the upper space via one or more holes or slits, wherein the lower space is adapted to guide the irrigation water to flow forward along the groove.

6. The growing system according to claim 5, wherein the upper space comprises a shape which has a downwards tapering cross-section and which opens into the lower space via the one or more hole(s) or slit(s).

7. The growing system according to claim 5, wherein the lower space constitutes an irrigation channel extending in the longitudinal direction of the trough, the irrigation channel being configured to convey irrigation water forward along the trough and having a width greater than a width of the one or more hole(s) or slit(s) in the transverse direction of the trough.

8. The growing system according to claim 5, wherein the one or more hole(s) or slit(s) are elongated and extend in the longitudinal direction of the trough.

9. The growing system according to claim 1, wherein the first and second side walls extend below the bottom wall of the trough and constitute a leg structure supporting the trough.

10. The growing system according to claim 1,
    wherein the second end of the trough is open for discharging irrigation water from the trough, or
    wherein, at the second end of the trough, the first and second side walls extend in the longitudinal direction of the trough farther than the bottom wall of the trough, or
    wherein, at the second end of the trough, the bottom wall of the trough is provided with an opening.

11. The growing system according to claim 1, wherein the first end of the trough is provided with an open space connected to the two adjacent grooves and to the overflow channel, the open space being adapted to receive the irrigation water supplied into the first end of the trough.

12. The growing system according to claim 11, wherein the first end of the trough is sealed off by the end wall and the open space is limited by the first side wall, the second side wall, and the bottom wall of the trough.

* * * * *